Aug. 1, 1933.  E. P. DEAN  1,920,362
HOLLOW RIVET SETTING TOOL
Filed Oct. 9, 1931  2 Sheets-Sheet 1
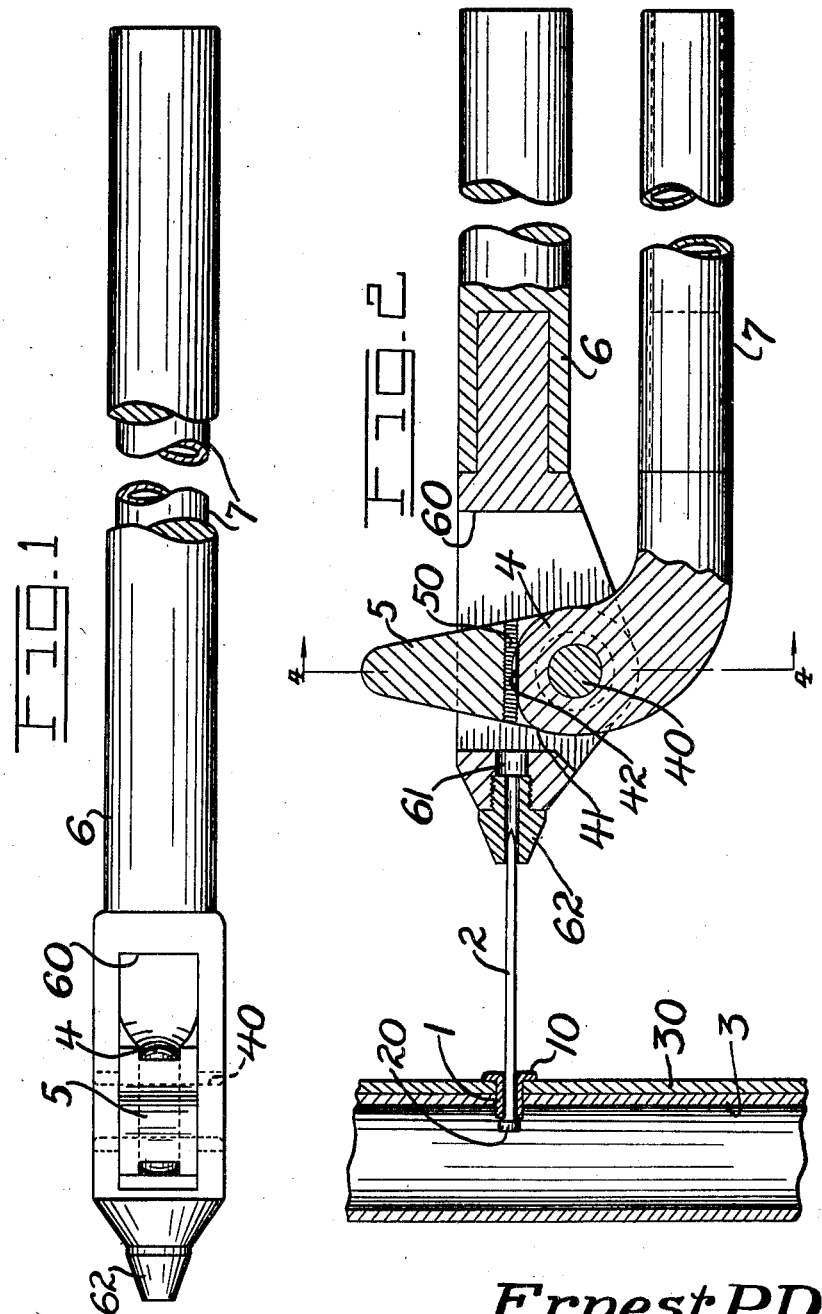
Inventor
*Ernest P. Dean*
By *Charles L. Reynolds*
Attorney Aug. 1, 1933. E. P. DEAN 1,920,362
HOLLOW RIVET SETTING TOOL
Filed Oct. 9, 1931 2 Sheets-Sheet 2
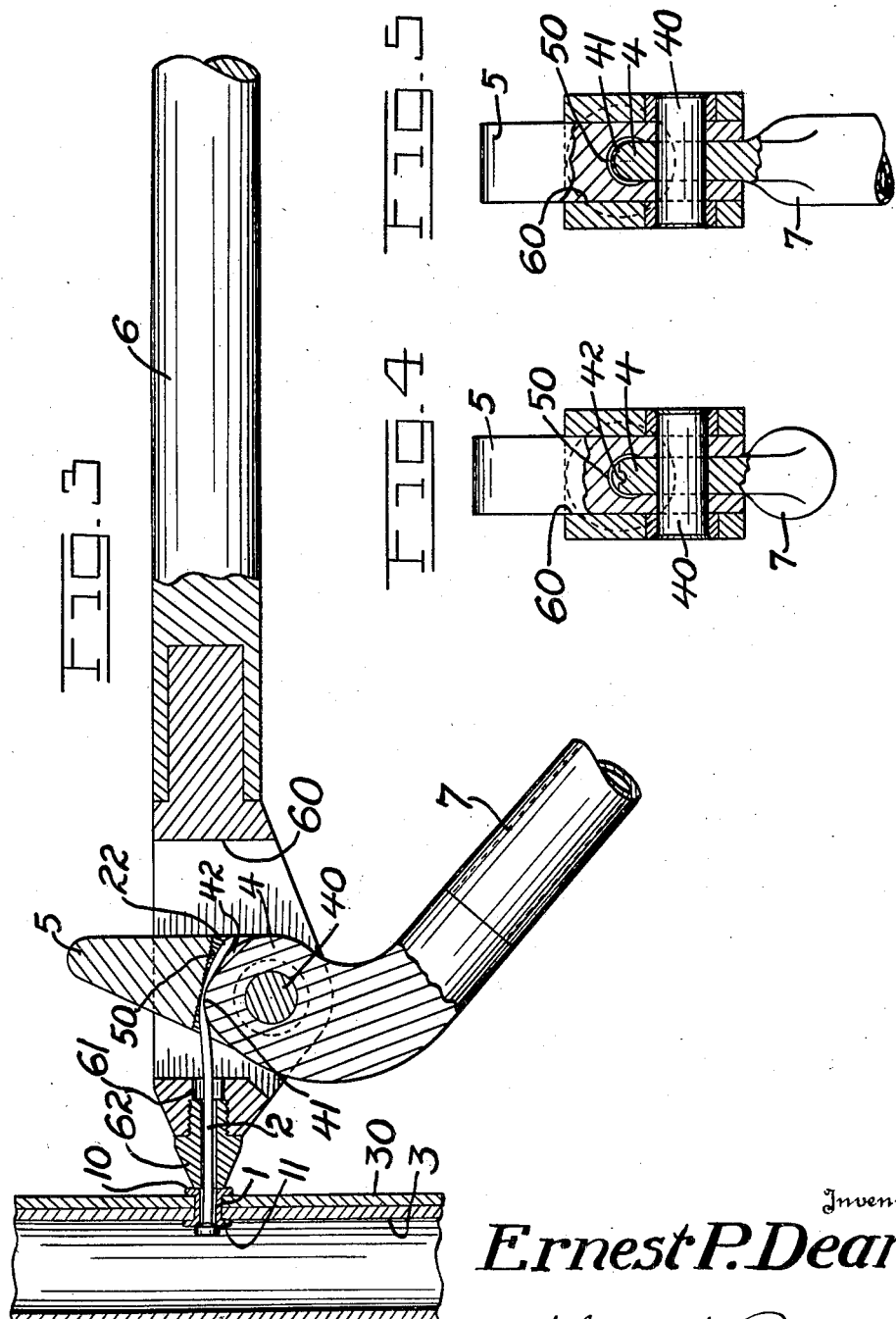
Inventor
*Ernest P. Dean*
By *Charles L. Reynolds*
Attorney Patented Aug. 1, 1933

1,920,362

UNITED STATES PATENT OFFICE 1,920,362

HOLLOW RIVET SETTING TOOL

Ernest P. Dean, Seattle, Wash., assignor to Boeing Airplane Company, Seattle, Wash., a Corporation of Washington Application October 9, 1931. Serial No. 567,869

10 Claims. (Cl. 218—19.)

My invention relates to a tool for setting up hollow rivets—that is to say, for forming a head upon the inner end of a hollow rivet by drawing outwardly on the projecting shank of a nail, the head of which engages the inner end of the shank of the rivet, thereby to spread the inner end of the rivet and form an inner head thereon.

Such rivets are employed in locations where it is impossible to apply a rivet with the head inside, or to buck up a head from the inside, for instance, in securing metallic plates upon the tubular frame members of aircraft, in locations wherein a riveting tool or buck cannot be employed.

It is an object of the present invention to provide a tool of the character indicated which may be quickly applied, simply and quickly operated, and which, when the operation is completed, may be promptly detached from the nail and rivet, so that the whole operation may be performed in a minimum of time.

It is a further object to provide a tool of the character indicated which shall be so constructed that the projecting shank of the nail is squeezed off to assist in detaching the tool from the nail shank after the setting operation has been completed.

It is a further object to provide a tool having the advantages enumerated above, which, though simple in construction, shall be rugged, and in which the strains generated shall not have a tendency to break or impair the efficiency of the tool.

My invention comprises the novel parts, and the novel combination and arrangement thereof, such as is shown in the accompanying drawings, in a form now preferred by me, and as described in this specification and defined more particularly by the claims which terminate the same.

Figure 1 is an edge view of the tool.

Figure 2 is a view at right angles to Figure 1, parts being broken away and shown in section, illustrating the tool in process of being applied to a nail shank, and Figure 3 is a similar view showing the setting operation about completed.

Figure 4 is a cross section on the line 4—4 of Figure 2, and Figure 5 is a similar view showing parts in the position corresponding to the position in Figure 3.

The hollow rivet 1 is of conventional type, having a head 10, and its central aperture is of a size to receive the shank 2 of a nail, the head 20 of which engages the inner end of the shank of the rivet 1, but is large enough that it cannot be pulled out through the aperture in the rivet. The nail and rivet, thus assembled, are passed through registering apertures in parts to be secured together,—for instance, the metal plate 30 and the hollow tubular fuselage member 3.

I provide means to grasp and clamp the projecting end 2 of the nail shank, these means comprising in effect a head 4 pivoted at 40 and having a surface 41 eccentric of the pivot and a cooperating clamping member which preferably, but not necessarily, takes the form of a clevis 5 likewise pivoted at 40, and free to turn with the head 4. This member 5 might be independently mounted and movable towards the head 4 for clamping. This clevis has a channel or groove, indicated at 50, extending for some considerable distance, but disposed to closely embrace one side of the nail shank. The head 4 may likewise be grooved, as indicated at 42, to permit the nail shank to pass between this groove and the groove 50, yet to fit the head 4 closely within the groove of the clevis.

Now when the head 4 is swung upon its pivot 40, the eccentric surface 41 will tend to displace the nail shank to one side. The tendency to bend the nail will be resisted by the engagement of the nail shank throughout the considerable length of the channel in the clevis, and the clevis will only begin to swing after the head 4 had swung sufficiently to grip the nail shank securely between the cam 41 and the channel 50. The stresses generated are only tension in the clevis from the pivot pin 40 outwardly to the point where the cam engages the nail, and these can be properly calculated and resisted. There is no clamping stress transmitted to the support for the pin 40, since the clevis is supported wholly from the pin itself, so that all parts not so stressed can be made lighter without danger of breakage.

As the head 4 is swung further, the nail shank is drawn outwardly, and this movement is absorbed by bending the shank to such a degree as is illustrated in Figure 3.

To swing the head and by reaction thereto draw the nail 2 outwardly, I provide two arms 6 and 7. The arm 7 is secured to rotate with, or formed as a part of, the head 4, and the arm 6 is bifurcated, as indicated at 60, to receive the head 4 and to serve as the support for the pivot pin 40. The end of the arm 6 is preferably apertured, as indicated at 61, through which aperture passes the nail shank 2. There may be secured in this aperture an apertured die 62, the aperture thereof being of a size to fit rather snugly about the nail, and the end of this die (or if a die is not used, the end of the arm 6) bears upon the head 10 of the rivet, and tends to press it inwardly, or towards the work.

In operation, the nail having been engaged within the rivet, and its shank being clamped by the head 4 and clevis 5, the nail and rivet are inserted in the aperture wherein it is to be secured, as previously described, and the die 62 is pressed down upon the head of the rivet to retain it in place. Now, the rivet being properly seated and the nail shank being properly engaged with the tool, the arm 7 is swung away from the arm 6 to clamp the nail shank tightly and to draw it outwardly.

A nail bent as illustrated in Figure 3 would be most difficult to disengage from the tool—especially from the die 62, which must embrace it closely to position the arm 6 to bear upon the rivet head. It has always been considered necessary heretofore, so far as I am aware, to avoid bending the nail, and devices made with this latter object did not properly hold the nail, or were slow, or both. However, by my device, the bent end of the nail can be severed at the bend, and by the same instrumentality and by continuation of the same movement and effort which produced the bend. The groove 50 may be corrugated to this end, to react with the cam surface 41 and to bite into, squeeze down, and weaken the nail shank until, when it has been drawn out to complete the inner head 11 of the rivet, the nail shank has been bent and weakened to such an extent that upon application of a slightly greater pressure upon the arm 7 than is required to set the rivet, the nail will break at the point where it is clamped. The pointed end 22 is separated from the remainder and thus, though the nail has been bent in the process of setting the rivet, this bending does not prevent easy disengagement of the tool from the nail, for the portion of the nail remaining projecting from the rivet is reasonably straight and can be withdrawn from the die without difficulty. This projecting portion may be clipped off with side-cutting pliers, and the rivet is complete. The end of the clevis projects from the bifurcated arm 6, whereby it can be grasped or struck to free it from the nail.

What I claim as my invention is:

1. A tool for setting hollow rivets by drawing out a nail shank to spread the rivet shank with the nail head, comprising a die apertured to receive the nail shank and to bear upon the rivet head, and cooperating elements reacting from said die and each mounted on the same pivot, disposed thereon, to clamp the nail shank and to draw the nail through the die and outwardly of the rivet.

2. A tool for setting hollow rivets by drawing out a nail shank inserted in the rivet to spread the inner end of the rivet with the nail head comprising cooperating elements to clamp and squeeze the projecting nail shank and to draw it outwardly, and means operatively associated with the clamping elements, and against which they react in pulling, to bear against the rivet head and prevent withdrawal of the rivet, the clamping elements being formed to notch and sever the nail shank into two parts by application of force to the clamping elements in excess of that required to hold the nail while it is being drawn outwardly.

3. A tool for setting hollow rivets by drawing out the shank of a nail inserted through the rivet to spread the rivet's inner end with the nail's head, comprising a die apertured to pass the nail shank therethrough, thereby being positioned to bear upon the rivet head, and a pair of cooperating elements supported upon and movable relative to the die, thereby to clamp and draw outwardly the nail shank, said elements being formed to squeeze and divide the nail shank into two parts, outwardly of the die, by application of force to said cooperating elements greater than that necessary for clamping the shank.

4. A tool for setting hollow rivets by drawing out the shank of a nail inserted through the rivet to spread the rivet's inner end with the nail's head, comprising an arm bearing at one end upon the rivet's head, alongside the nail shank, a second arm pivoted by one end near such end of the first arm, offset from the nail, and eccentrically formed at its pivoted end, and a clevis pivoted upon the same center as the second arm, and cooperating with its eccentric end to clamp the nail shank therebetween and to draw the same outwardly as the second arm is swung relative to the first arm.

5. A tool for setting hollow rivets by drawing out the shank of a nail inserted through the rivet to spread the rivet's inner end with the nail's head, comprising an arm bearing at one end upon the rivet's head, alongside the nail shank, a second arm pivoted by one end near such end of the first arm, offset from the nail, and eccentrically formed at its pivoted end, and a clevis having a groove of considerable longitudinal extent, the clevis being pivoted concentrically with the second arm to dispose such groove to embrace closely one side of the nail shank, the eccentric end of the second arm engaging the other side of the nail shank and cooperating with the clevis to clamp the same and to draw it outwardly, as the second arm is swung relative to the first arm.

6. A tool for setting hollow rivets by drawing out the shank of a nail inserted through the rivet to spread the rivet's inner end with the nail's head, comprising an arm bearing at one end upon the rivet's head, alongside the nail shank, a second arm pivoted by one end near such end of the first arm, offset from the nail, and eccentrically formed at its pivoted end, and a clevis having a groove of considerable longitudinal extent, the clevis being pivoted concentrically with the second arm to dispose such groove to embrace closely one side of the nail shank, the eccentric end of the second arm engaging the other side of the nail shank and cooperating with the clevis to clamp the same and to draw it outwardly, as the second arm is swung relative to the first arm, and the groove in the clevis being corrugated to weaken the nail shank upon pressure thereagainst, whereby a slightly greater force than that required to set the rivet applied to swing the second arm will sever the nail shank at the point where it is clamped.

7. A tool of the character described, comprising a pivoted eccentric head to engage one side of a nail shank, a clevis pivoted concentrically therewith and adapted to embrace closely the opposite side of the nail shank, to be thereby prevented from turning until the shank is engaged by the eccentric head, means to impart a rotary movement to the eccentric head, and means to resist the thrust lengthwise of the shank caused by the clamping of the shank and its movement lengthwise.

8. A tool for setting hollow rivets by drawing out a nail shank to spread the inner end of the rivet with the nail head, comprising means bearing upon the rivet head to prevent withdrawal of the rivet, and cooperating elements, each element being supported on and swingable about a pivot point fixed relative to said bearing means and relatively movable to clamp the nail shank projecting from the rivet and to draw it outwardly.

9. A tool for setting hollow rivets by drawing out a nail shank to spread the inner end of the rivet with the nail head, comprising a member bearing on the rivet head and disposed with its length parallel to the nail shank, and cooperating elements, each element being supported on an swingable about a pivot point fixed in said bearing member to clamp the nail shank and to draw it outwardly, said bearing member being adapted to react against the rivet head as the clamping elements pull outwardly, thereby to prevent withdrawal of the rivet.

10. A tool for setting hollow rivets by drawing out a nail shank to spread the inner end of the rivet with the nail head, comprising a member bearing upon the rivet head to prevent withdrawal of the rivet, a pair of members, each member of said pair being directly supported on said first member for rocking movement transversely of the length of the nail shank, and by such movement to be drawn together to clamp the shank therebetween.

ERNEST P. DEAN.